Figure 1:
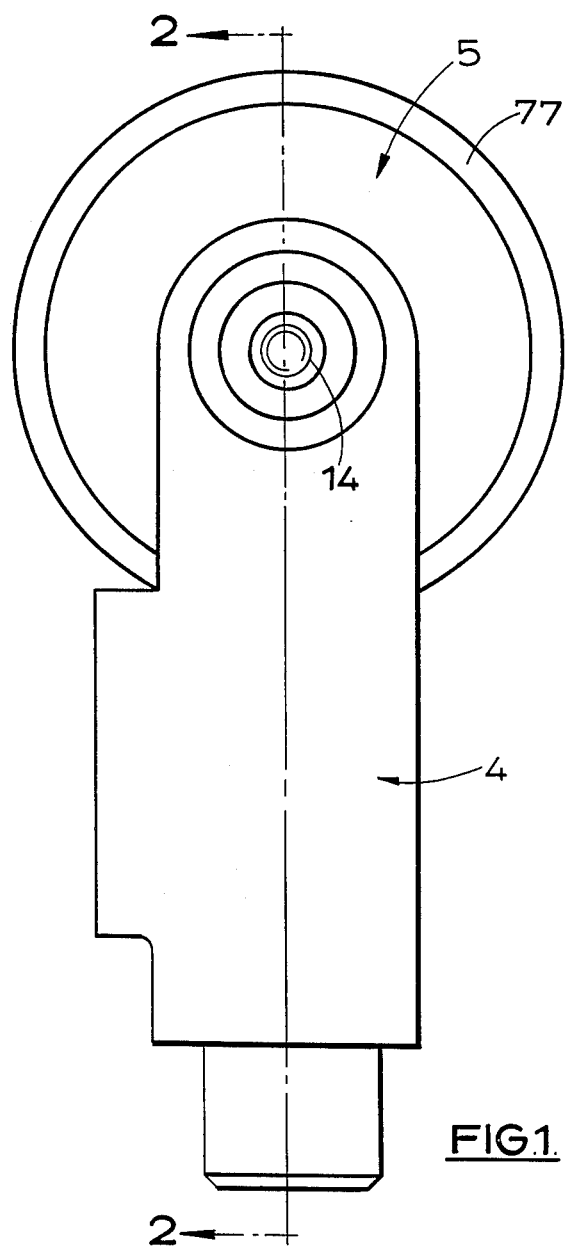

United States Patent [19]

Farr

[11] Patent Number: 4,714,301
[45] Date of Patent: Dec. 22, 1987

[54] HYDRAULIC ANTI-SKID BRAKING SYSTEMS FOR VEHICLES

[75] Inventor: Glyn P. R. Farr, Warwickshire, England

[73] Assignee: Lucas Industries Public Limited Company, United Kingdom

[21] Appl. No.: 837,004

[22] Filed: Mar. 6, 1986

[30] Foreign Application Priority Data

Mar. 15, 1985 [GB] United Kingdom ............... 8506707

[51] Int. Cl.$^4$ ......................... B60T 8/42; B60T 13/70
[52] U.S. Cl. .................................. 303/116; 303/115; 188/181 A
[58] Field of Search ................ 303/115, 116, 94, 99, 303/113, 117, 6 C, 6 R; 188/181 A, 181 R

[56] References Cited

U.S. PATENT DOCUMENTS 4,353,440 10/1982 Farr ............................ 303/116 X
4,556,260 12/1985 Maemara ...................... 303/116

Primary Examiner—Andres Kashnikow
Assistant Examiner—Robert J. Oberleitner
Attorney, Agent, or Firm—Laff, Whitesel, Conte & Saret

[57] ABSTRACT

In a modulator assembly of the kind including a dump valve operable by skid sensor to cause closure of a valve to isolate a master cylinder from a brake and initiate operation of a pump, the modulator assembly incorporates a time-delay piston of differential outline working in a stepped bore in a housing. The piston is exposed a its end of smaller area to pressure in the master cylinder which is applied to the brake through a flow-control regulator valve and at its end of greater area to pressure in an expansion chamber through fixed outline . Equalization of the pressures acting on the piston causes the piston to move in a direction to open the regulator valve whereby to ensure that fluid from the master cylinder can flow to the brake at a rate faster than the rate at which it is returned from the brake by the pump.

6 Claims, 2 Drawing Figures

HYDRAULIC ANTI-SKID BRAKING SYSTEMS FOR VEHICLES

This invention relates to hydraulic anti-skid braking systems for vehicles of the kind in which a supply of operating fluid from a supply, suitably an hydraulic master cylinder, to a brake is modulated by a modulator assembly in accordance with skid signals from skid sensing means, and an hydraulic pump is provided to control brake re-application following the emission of a skid signal, a dump valve operable by the skid sensing means following closure of valve means controlling communication between the supply and the brake, whereafter operation of the pump is initiated.

In anti-skid systems of the kind set forth, when more than 50% of the braking system is to be controlled by a single anti-lock device, it is essential to ensure that the brake can be re-applied automatically if the dump valve is held open for more than a predetermined time. For example in a system in which the skid sensing means comprises a flywheel assembly incorporating a flywheel member and a reaction member which are relatively movable angularly to cause relative axial movement to occur with the members moving into an expanded condition, such a situation could arise if the members became stuck in the expanded condition. Since the pump is operative to pump fluid back to the master cylinder, after a predetermined period of time the brakes will be lost altogether.

According to our invention in an hydraulic anti-skid braking system of the kind set forth the modulator assembly incorporates a time-delay piston of differential outline working in a stepped bore and exposed at its end of smaller area to pressure at the supply which is applied to the brake through the valve means and at its end of greater area to pressure in an expansion chamber which is equal to that applied to the brake, equalisation of the pressures acting on opposite ends of the time-delay piston causing the piston to move in a direction progressively to open the valve means whereby to ensure that fluid from the supply flows into the brake at a rate faster than the rate at which it is returned from the brake to the supply by the pump.

This ensures that after a predetermined period of time the brake is re-applied automatically irrespective of the mode of the skid sensing means and the dump valve.

Conveniently the pressure at the supply to which the end of the piston of smaller area is exposed is applied to the brake through a variable orifice in a flow-control regulator valve, and the pressure in the expansion chamber is applied to the end of the piston which is greater area through a fixed orifice.

Figure 2:
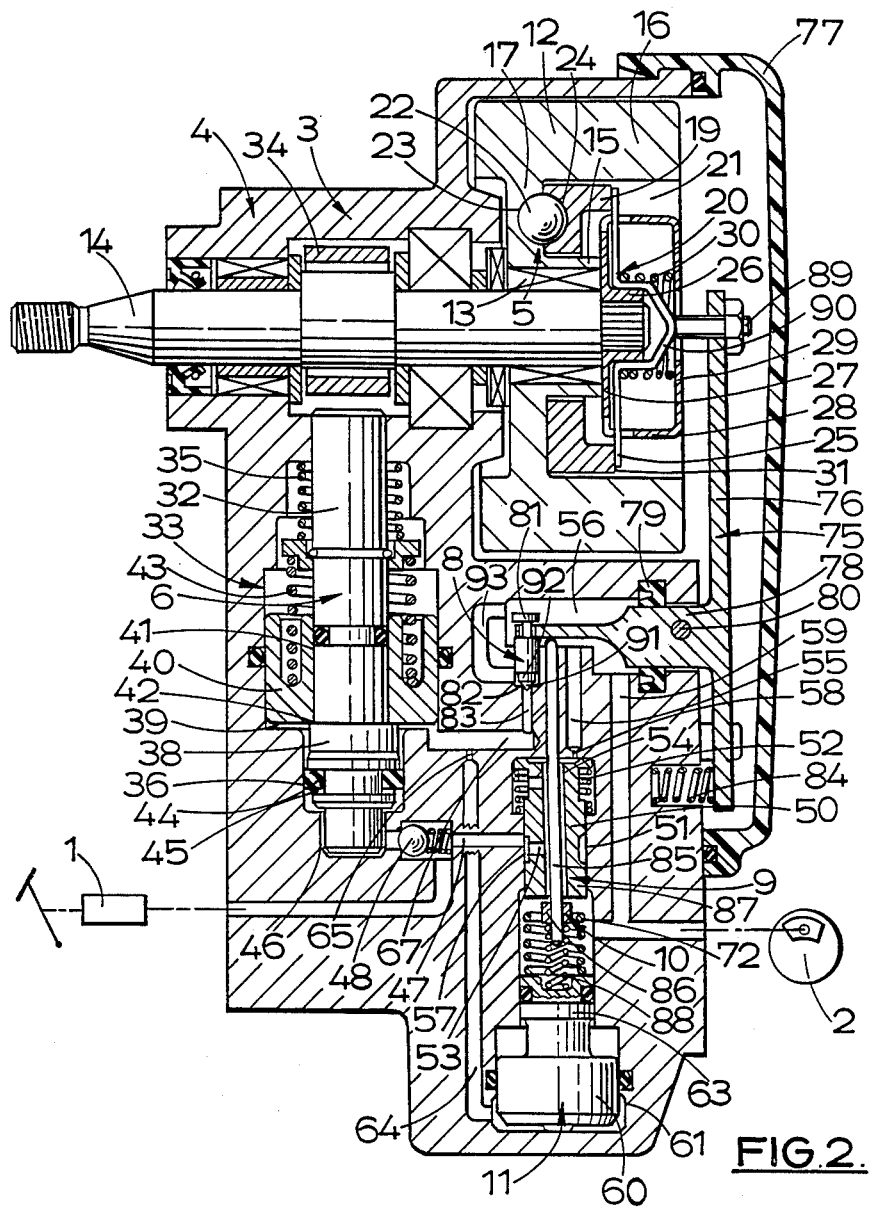

One embodiment of our invention is illustrated in the accompanying drawings in which:

FIG. 1 is a end view of a modulator assembly for an anti-skid hydraulic braking system for a vehicle; and FIG. 2 is a section on the line 2—2 of FIG. 1 with the modulator assembly incorporated in the layout of a braking system.

The anti-skid braking system illustrated in the drawings comprises a pedal-operated hydraulic master cylinder 1 for operating a wheel brake 2, and a modulator assembly 3.

The modulator assembly 3 comprises a casing 4 in which is incorporated a flywheel mechanism 5, a pump 6, a dump valve 8, a flow-control regulator 9, an isolating valve 10, and a time-delay piston 11.

The flywheel mechanism 5 comprises a flywheel 12 which is rotatably mounted on a bearing 13 at the inner end of a shaft 14 which extends transversely through the casing 4 and is driven from a wheel to be braked by the brake 2, suitably through an endless belt. The flywheel 12 comprises a central hub 15 from which an outer annular rim 16 is carried by means of a radial web 17. The hub 15 and the rim 16 both project axially outwards from the web 17 by smaller and greater distances respectively, and a reaction member 19 of annular outline and a spring-loaded clutch assembly 20 are both housed within a space 21 defined between the rim 16, the hub 15, and the free end of the shaft 14.

The reaction member 19 surrounds the hub 15 and balls 22, suitably three in number, are housed in angularly spaced recesses 23, 24 of complementary outline in adjacent faces of the flywheel 12 and the reaction member 19. The engagement of the balls 22 in the recesses 23 and 24 acts to centre the reaction member 19, holding it in a spaced relationship at its inner and outer edges with respect to the hub 15 and the rim 16. The edges of the recesses 23, 24 define ramps up which the balls 22 are adapted to ride upon relative rotation between the flywheel 12 and the reaction member 19, with the reaction member 19 moving substantially simultaneously axially away from the flywheel 12.

The clutch 20 comprises a member 25 of generally top-hat section which is mounted for axial sliding movement on a nut 26 screwed onto the free end of the shaft 14. The nut 26 has an integral radial flange 27 contiguous at its outer end with a cylindrical skirt 28 of which the free end is peened over or otherwise formed into an inturned flange 29 defining an abutment for one end of a compression spring 30, of which the inner end acts on the clutch member 25 to urge it into frictional engagement with a clutch face 31 on the reaction member 19, in turn urging the reaction member 19 towards the flywheel 12 with the balls 22 located at the bases of their recesses 23, 24.

The pump 6 comprises a plunger 32 which is housed in a longitudinal bore 33 of stepped outline in the casing 4. At its inner end of the plunger 32 works through the portion of the bore 33 which is of smallest diameter and is held away from an eccentric drive portion 34 on the shaft 14 by a compression spring 35. An enlarged head 38 carried by the plunger 32 works in outer end 36 of the bore 33 which is of greatest diameter and which is closed.

An expander chamber 39 constituting a fluid reservoir for the pump 6 is defined in the bore 33 between the head 38 and an expander piston 40 which works in the bore 33 and has a central bore 41 through which the plunger 32 works. The expander piston 40 is normally urged into engagement with a shoulder 42 on the plunger 32 by means of a compression spring 43 which is stronger than the spring 35. In this position, the effective volume of the reservoir 39 is at a minimum.

A seal 44 housed in a groove 45 in the head 38 defines an inlet valve through which fluid is drawn from the chamber 39 during an induction stroke and into a pumping chamber 46 in the bore 37. Upon movement of the plunger 32 in the opposite direction, during a power stroke, the inlet valve closes with the seal 44 sealing against the wall at the inner end of the groove 45 so that fluid is discharged from the chamber 46 to a passage 47 through a one-way outlet valve 48. The passage 47 is disposed between the master cylinder 1 and the flow control regulator valve 9.

The flow control regulator valve 9 comprises a spool 50 which works in a bore 51 in the casing 4. In a position of maximum flow the spool 50 is urged inwardly by a compression spring 52, into abutment with a face at the inner end of the bore 51. A radial passage 53 in the spool 50 is in free communication with the passage 47 to connect it to a central through-bore 54 in the spool 50 leading to the brake 2, both through the isolating valve 10, and through a longitudinal passage 55 incorporating an orifice 58 of fixed area, a chamber 56, and a longitudinal passage 59.

In this position a variable orifice defined by the end of the passage 47 and an annular recess 57 at the outer end of the passage 53 is at its greatest area. A wall defining the upper edge of the recess 57 defines a metering edge.

The time-delay piston 11 is of stepped outline having an outer portion 60 of greater area working in a blind bore 61 and an inner portion 63 working in the bore 51 itself. The blind bore 61 is connected to the expansion chamber or reservoir 39 through a passage 64 including a restricted orifice 65, and a passage 67 leading to the chamber 39 itself.

A compression spring 72 urges the piston 11 outwardly into abutment with the closed outer end of the bore 61.

The dump valve 8 and the isolating valve 10 are operated by a lever assembly 75 with which the flywheel mechanism 5 is adapted to co-operate. As illustrated, an operating lever 76 in the form of an elongate strip is mounted on the exterior of the casing 4, being enclosed within a cover 77 which also encloses the flywheel mechanism 5. An arm in the form of a circular shaft 78 rigid with and normal to the lever 76 projects from the lever 76 into the chamber 56 through a seal 79, and the arm 78 is adapted to pivot about a transverse pivot pin 80 which lies on a chord displaced from the axis of the shaft 78 in a direction towards the flywheel mechanism 5. The pivot pin 80 is fast in the housing 4 and is disposed on the opposite, outer side, of the seal 79 from the chamber 56.

The dump valve 8 comprises a valve member 81 engagable with a seating 82 surrounding the outer end of a longitudinal passage 83 which communicates at its opposite inner end with the passage 67. The valve member 81 comprises a piston guided to slide in a bore between the chamber 56 and the passage 83, and a head 91 at the free end of a portion 92 of reduced diameter is engagable with the seating 82. A passage 93 ensures that the portion 92 is at all times subjected to the pressure in the chamber 56. Thus the valve member 81 is urged towards the seating 82 by the pressure in the chamber 56 acting over a net effective area on the piston.

A spring 84 acting on the end of the lever 76 remote from the flywheel mechanism 5 urges the lever 76 angularly about the axis 80 so that the arm 78, in turn, urges the valve member 81 against the seating 82 to close the dump valve 8. In this position the isolating valve 10 is held open with the arm 78 acting through a push-rod 85 to urge a head 86 carried by the push-rod 85 away from a seating 87 surrounding the outer end of the bore 54 in the spool 50 against the load in a spring 88, and an adjuster screw 89 at the opposite end of the lever 76 is spaced from a conical outer end 90 of the clutch member 25.

The modulator assembly 3 is illustrated in a normal "brakes-off" inoperative position, with the variable orifice defined by the recess 57 in a position of maximum flow.

When the master cylinder 1 is operated to apply the brake 2, fluid under pressure flows to the brake 2 through the flow-control regulator 9, and the open isolating valve 10, with flow in the opposite direction from the through-bore 54 restricted by the orifice 58. The pressure from the master cylinder 1 also acts upon the one-way outlet valve 48 in a closing direction, on the dump valve 8 through the passage 59, and on the inner end of the time delay piston 11, which is of smaller area. This fluid pressure also acts on the inner end of the arm or shaft 78. Because the pivot pin 80 is deliberately offset from the axis of the shaft 78, the force resulting from this applies a turning moment to load the lever 76 in a counterclockwise direction in turn loading the dump valve 8 further in a closing direction, with the valve member 81 acting as an abutment for the lever 76.

Under such conditions the shaft 14 rotates freely with the plunger 32 urged out of co-operation with the eccentric 34 by means of the spring 35. The flywheel assembly 5 rotates with the shaft 14, being driven by the clutch 20, and the flywheel 12 and the reaction member 19 both rotate together due to the location of the balls 22 in the recesses 23 and 24. The flywheel mechanism 5 runs clear of the lever 76 by a small amount determined by a clearance between the adjuster screw 89 and the clutch member 25.

Normal decelerations of the braked wheel will not cause the flywheel 12 to generate a torque sufficient to overcome the force in the spring 30. However, should the braked wheel pass onto a slippery surface, the braked wheel will decelerate rapidly accompanied by a similar deceleration of the shaft 14 and the reaction member 19. Due to its inertia the flywheel 12 will continue to rotate at a greater speed, and the torque thus generated causes the balls 22 to ride up the ramps defined by the recesses 23 and 24, overcoming the load in the spring 30 and the pressure bias on the shaft 78, and with the relative angular movement of the flywheel 12 and the reaction member 19 being accompanied by axial movement of the reaction member 19 away from the flywheel 12. At the extent of the movement of the balls 22 up the ramps, the flywheel 12 and the reaction member 19 are in an expanded condition and both overrun relative to the shaft 14 with the clutch 20 slipping. Expansion of the flywheel mechanism 5 applies a force to the lever 76, causing it to pivot about the pin 80 as a fulcrum. This action first permits the isolating valve 10 to close and then opens the dump valve 8 subsequently. This is achieved by providing a degree of lost-motion between the arm 78 and the valve member 81 which is only taken up after the head 86 has engaged with the seating 87.

Closure of the isolating valve 10 restricts communication between the master cylinder 1 and the brake 2 through the passage 47 and the variable orifice, and opening the dump valve 8 reduces the pressure applied to the brake 2 by returning fluid from the brake 2 to the expander chamber or reservoir 39 through the passage 59, the chamber 56, and the passages 93, 83 and 67. This, in turn, urges the expander piston 40 relatively towards the cam 34. Also closure of the isolating valve 10 causes the spool 50 to move relatively towards the time delay piston 11 until flow through the variable orifice is almost cut-off. Fluid now flows from the master cylinder 1 to the brake 2 through the flow-control regulator valve 9 at a rate relative to the pressure difference between opposite ends of the spool 50, and the size of the fixed orifice 58. This pressure difference is determined by the area of the spool 50, and the magnitude of the spring forces acting upon it.

As the expander piston 40 moves towards the cam 34, the force in the spring 43 overcomes the force in the spring 35 and loads the plunger 32 into engagement with the cam 34. Thereafter the plunger 32 oscillates to draw fluid from the expander chamber or reservoir 39 and pump it into the pumping chamber 46. The inlet to the pumping chamber 46 is restricted by a small annulus above the seal 44, acting as the inlet valve, and this provides a steady output for the pump 6 at vehicle speeds greater than 10 kph.

When the speed of the flywheel 12 recovers at the termination of the skid following brake release, the shaft 14 accelerates and on reaching the speed of the flywheel 12, the axial force applied to the reaction member 19 by the spring 30 is operative to contract the flywheel mechanism 5, with the balls 22 running down the ramps, and the reaction member 19 moving both axially and angularly with respect to the the flywheel 20. This movement of the reaction member 19 is accompanied by a corresponding movement of the lever 76 about the pivot pin 80 to permit the dump valve 81 to close, signifying the termination of the skid signal. The brake 2 is therafter re-applied by the flow of fluid from the pump chamber 46, but at a rate determined by the flow-control regulator valve 9. Since the spool 50 is in a "down" position with the seat 87 in an equivalent position, the isolating valve 10 cannot re-open. The flow-control regulator valve 9 remains in the metering mode at which restricted rate the pressure applied to the brake through the bore 54 and the passages 55 and 59 is increased.

As the pressure applied to the brake 2 rises, second or subsequent skid signals may be emitted whereafter the sequence described above is repeated. During such second or subsequent skid signals the isolating valve 10 remains closed.

Should no further skid signals be received, the output from the pump 6 is progressively limited by movement of the expander piston 40 relatively away from the cam 34, and when the pressure applied to the brake 2 is substantially equal to the inlet pressure, the spool 50 returns to its original, initial, position with the isolating valve 10 open.

The output from the pump 6 is matched to the flow to the brake 2 through the flow-control regulator valve 9. This means that during brake release and recovery of fluid dumped to the expander chamber or reservoir 39, the flow from and to the master cylinder 1 is substantially constant and the driver will not feel an adverse effect on the brake pedal. At vehicle road speeds below, say 10 kph, the flywheel mechanism 5 has insufficient energy to actuate the dump valve 8 against the force in the spring 30 and the force of the pressure in the chamber 56. Should a skid signal be received at, say, 11 kph, the foot pedal travel may increase slightly due to the difference between the flow through the flow-control regulator valve 9 and the output from the pump 6.

When the pressure from the master cylinder 1 is removed at the end of a braking cycle, the spring 35 forces the plunger 32 away from the cam 34 and the expander piston 40 expels fluid from the expander chamber or reservoir 39 into the passage 47.

Ensuring that the pivot pin 80 is offset from the axis of the shaft 78 in a direction towards the flywheel mechanism 5 applies a moment to the lever 76 in a counterclockwise direction proportional to brake pressure, namely the pressure force applied to the arm or shaft 78. This means that on a good road surface, with the brake pressure high, the flywheel mechanism must generate a relatively higher torque before the dump valve 8 will open. Similarly, for surfaces of lower friction, the pressure force is correspondingly lower and thus the threshold of the flywheel mechanism 5 is proportionally lower.

When the pressure applied to the brake 2 is released by operation of the dump valve 8, the force on the flywheel mechanism 5 also decreases so that the clutch 20 is loaded only by the springs 30 and 84 whilst it "runs-on" against the clutch 20 to provide an improved speed reference.

Should the dump valve 8 remain in its open position for more than a predetermined time because of, for example, a failure of the ball and ramp mechanism in the flywheel mechanism 5, then the pressure in the chamber 61 will tend to equalise, through the orifice 65, with the pressure in the expander chamber 39 which is equal to the pressure applied to the brake 2. Since substantially equal pressures will then be applied to opposite ends of the stepped, time-delay, piston 11, the piston 11 will move slowly towards the flow-control regulator valve 9 against the force in the spring 72. Whilst this is happening, the pump 6 will still be pumping fluid back to the master cylinder 1 at substantially the rate at which fluid is flowing to the brake 2 through the flow-control regulator valve 9. However when the piston 11 loads the spring 72 against the spool 50, the spring 72 therefore exerts a greater force upon the spool 50. This has the effect of ensuring that the fluid flows into the brake 2 faster than it can be pumped out. Thus the brake 2 is re-applied, but at a controlled rate.

For normal operation the pressure applied to the brake 2 is higher than the pressure in the expander chamber 39. Since the lower pressure is applied through the orifice 65 to the end of the piston 11 which is of greater area, the higher pressure acts on the end of the piston 11 which is of smaller area to hold the piston 11 down against its abutment with the closed outer end of the bore 61.

Should a failure of the drive from the wheel to the shaft 14 occur after the dump valve 8 has opened, the brakes will automatically be re-applied by the flow-control regulator valve 9. In such a case the travel of the foot pedal will increase to compensate for the fluid dumped into the expander chamber 39. All subsequent brake-applying operations will be normal, but there will not be any anti-lock protection until the drive to the shaft 14 is repaired.

I claim:

1. An hydraulic anti-skid braking system for a vehicle comprising a brake on a wheel of the vehicle, a supply of operating fluid for applying said brake, skid sensing means for emitting skid signals in accordance with the behaviour of said wheel when said brake is applied, a modulator assembly for modulating said supply of operating fluid to said brake in accordance with said skid signals and incorporating an expansion chamber, valve means between said supply and said brake and movable between an open position and a closed position, and an hydraulic pump to control re-application of said brake following emission of said skid signal, and a dump valve to initiate operation of said pump following movement of said valve means into said closed position, said dump valve being movable between a closed position and an open position, transmission means acting between said skid sensing means, and said dump valve and said valve means, to hold said dump valve in said closed position and said valve means in said open position when no skid signal is present, and means defining a lost-motion connection in said transmission means, said lost-motion connection being so constructed and arranged as to permit said valve means to move into said closed position and subsequently for said dump valve to move into said open position, whereafter operation of said pump is initiated, wherein said modulator assembly comprises a stepped bore, and a time-delay piston of differential area working in said stepped bore and having a first end of smaller area exposed to pressure of said valve means and a second end of greater area exposed to pressure in said expansion chamber which is equal to that applied to said brake, equalisation of said pressures acting on said first and second ends of said time-delay piston causing said piston to move in a direction progressively to open said valve means whereby to ensure that fluid from said supply flows into said brake at a rate faster than the rate at which said fluid is returned from said brake to said supply by said pump.

2. A system as claimed in claim 1, including a flow-regulator valve incorporating a variable orifice and a fixed orifice, and the pressure at said supply to which said first end of the piston of smaller area is exposed is applied to said brake through said variable orifice in said flow-regulator valve, and said pressure in the expansion chamber is applied to said second end of said piston which is of greater area through said fixed orifice.

3. A system as claimed in claim 2, wherein said flow-regulator valve comprises a bore, a spool working in said bore, and said spool is provided with a through-bore, and a valve head is engageable with a seating in said spool at one end of said through-bore to isolate said supply from said brake in response to operation of said skid sensing means followed by closure of said dump valve and a progressive reduction in the size of said variable orifice, movement of said time-delay piston towards the flow-regulator valve causing movement of said spool relatively away from said head and in a direction to increase progressively the effective size of said variable orifice.

4. A system as claimed in claim 3, wherein a spring is incorporated, and, said time-delay piston acts on said spool through said spring which normally acts to urge said piston relatively away from said flow-regulator valve.

5. An hydraulic anti-skid braking system for a vehicle comprising a brake on a wheel of the vehicle, a supply of operating fluid for applying said brake, skid sensing means for emitting skid signals in accordance with the behaviour of said wheel when said brake is applied, a modulator assembly for modulating said supply of operating fluid to said brake in accordance with said skid signals and incorporating an expansion chamber, valve means between said supply and said brake, and an hydraulic pump to control re-application of said brake following emission of said skid signal, and a dump valve operable by said skid sensing means following closure of said valve means, whereafter operation of said pump is initiated, wherein said modulator assembly comprises a stepped bore, and a time-delay piston of differential area working in said stepped bore and having a first end of smaller area exposed to pressure of said valve means and a second end of greater area exposed to pressure in said expansion chamber which is equal to that applied to said brake, equalisation of said pressures acting on said first and second ends of said time-delay piston causing said piston to move in a direction progressively to open said valve means whereby to ensure that fluid from said supply flows into said brake at a rate faster than the rate at which said fluid is returned from said brake to said supply by said pump, including a flow-regulator valve incorporating a variable orifice and a fixed orifice, and the pressure at said supply to which said first end of the piston of smaller area is exposed is applied to said brake through said variable orifice in said flow-regulator valve, and said pressure in the expansion chamber is applied to said second end of said piston which is of greater area through said fixed orifice, and wherein said flow-regulator valve comprises a bore, a spool working in said bore, and said spool is provided with a through-bore, and a valve head is engageable with a seating in said spool at one end of said through-bore to isolate said supply from said brake in response to operation of said skid sensing means followed by closure of said dump valve and a progressive reduction in the size of said variable orifice, movement of said time-delay piston towards the flow-regulator valve causing movement of said spool relatively away from said head and in a direction to increase progressively the effective size of said variable orifice.

6. A system as claimed in claim 5, wherein a spring is incorporated, and said time-delay piston acts on said spool through said spring which normally acts to urge said piston relatively away from said flow-regulator valve.

* * * * *